(12) United States Patent
Sato (10) Patent No.: US 9,235,042 B2
(45) Date of Patent: Jan. 12, 2016

(54) EYEPIECE OPTICAL SYSTEM AND IMAGING APPARATUS

(71) Applicant: FUJIFILM Corporation, Tokyo (JP)

(72) Inventor: Kenichi Sato, Saitama-ken (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 14/572,810

(22) Filed: Dec. 17, 2014

(65) Prior Publication Data

US 2015/0177509 A1  Jun. 25, 2015

(30) Foreign Application Priority Data

Dec. 20, 2013 (JP) ................................. 2013-263499
Nov. 7, 2014 (JP) ................................. 2014-226576

(51) Int. Cl.
*G02B 25/00* (2006.01)
*H04N 5/232* (2006.01)

(52) U.S. Cl.
CPC .......... *G02B 25/001* (2013.01); *H04N 5/23293* (2013.01)

(58) Field of Classification Search
CPC .......... G02B 25/001; G02B 9/14; G02B 9/16; G02B 13/0035; G02B 9/12
USPC ................. 359/645, 716, 784, 785, 789, 790
See application file for complete search history.

(56) References Cited

U.S. PATENT DOCUMENTS

| 7,301,712 | B2 * | 11/2007 | Kamo ...................... G02B 9/14 |
| | | | 348/E5.025 |
| 2012/0127595 | A1 * | 5/2012 | Matsuo ..................... G02B 9/16 |
| | | | 359/716 |
| 2012/0224271 | A1 * | 9/2012 | Matsuo ................ G02B 25/001 |
| | | | 359/716 |
| 2013/0188072 | A1 * | 7/2013 | Hiyori .................. G02B 25/001 |
| | | | 348/222.1 |
| 2014/0340558 | A1 * | 11/2014 | Nakahara ................. G02B 9/16 |
| | | | 348/333.08 |

FOREIGN PATENT DOCUMENTS

JP  2002-048985   2/2002
JP  2010-175795   8/2010

* cited by examiner

*Primary Examiner* — Scott J Sugarman
(74) *Attorney, Agent, or Firm* — Young & Thompson (57) ABSTRACT

An eyepiece optical system substantially composed of a first lens having a positive refractive power with a convex surface on the eye point side, a second lens having a negative refractive power with a concave surface on the object side, and a third lens having a positive refractive power with an absolute value of radius of curvature of the eye point side surface being smaller than an absolute value of radius of curvature of the object side surface, disposed in order from the object side. The first lens to the third lens are all single lenses and, when the average refractive index of the first lens to the third lens is taken as NdH, the eyepiece optical system satisfies a conditional expression (1): $1.80 < NdH$.

16 Claims, 5 Drawing Sheets

EXAMPLE 1

FIG.1

EXAMPLE 1

FIG.2

EXAMPLE 2

FIG.3

EXAMPLE 3

EYEPIECE OPTICAL SYSTEM AND IMAGING APPARATUS

CROSS-REFERENCE TO RELATED APPLICATIONS

The present application claims priority under 35 U.S.C. §119 to Japanese Patent Application No. 2013-263499 filed on Dec. 20, 2013 and Japanese Patent Application No. 2014-226576 filed on Nov. 7, 2014. Each of the above applications is hereby expressly incorporated by reference, in their entirety, into the present application.

BACKGROUND OF THE INVENTION

1. Field of the Invention

The present invention relates to an eyepiece optical system and an imaging apparatus, and more specifically to an eyepiece optical system that can be used favorably for the observation of an image displayed on a display screen, and an imaging apparatus equipped with the eyepiece optical system.

2. Description of the Related Art

Heretofore, eyepiece optical systems that magnify images displayed on display screens such as, for example, liquid crystal display elements, for observing the images with naked eyes have been used for viewfinders of video cameras. Recently, digital cameras that use similar viewfinders have been increasing, and the demand for downsizing is growing.

As eyepiece optical systems composed of three lenses and fit for the aforementioned application, the eyepiece optical systems as described, for example, in Japanese Unexamined Patent Publication No. 2002-048985 and Japanese Unexamined Patent Publication No. 2010-175795 are proposed.

SUMMARY OF THE INVENTION

In the meantime, the pixel count of display elements have been increasing each year, and further improvement in performance is demanded for the eyepiece optical systems to match with higher pixel count. Further, eyepiece optical systems having a wide viewing angle are demanded due to increase in display screen size of the display elements along with the increase in pixel count and increase in angle of view of digital cameras and the like.

The eyepiece optical systems described in Japanese Unexamined Patent Publication No. 2002-048985, however, can match mostly with small display elements and cannot match with higher pixel count of recent years. The eyepiece optical system according to Example 4 of Japanese Unexamined Patent Publication No. 2002-048985 may match with a display element having a large display screen size, but has large field curvature and cannot be said to have a high performance. The eyepiece optical system described in Japanese Unexamined Patent Publication No. 2010-175795 has a drawback that its viewing angle is slightly narrow.

The present invention has been developed in view of the circumstances described above, and it is an object of the present invention to provide an eyepiece optical system which is small, yet having a sufficiently wide viewing angle and high optical performance that can match with higher pixel count, and an imaging apparatus equipped with the eyepiece optical system.

An eyepiece optical system of the present invention substantially consists of three lenses, composed of a first lens having a positive refractive power with a convex surface on the eye point side, a second lens having a negative refractive power with a concave surface on the object side, and a third lens having a positive refractive power with an absolute value of radius of curvature of the eye point side surface being smaller than an absolute value of radius of curvature of the object side surface, disposed in order from the object side, wherein the first, the second, and the third lenses are all single lenses, and the eyepiece optical system satisfies a conditional expression (1) given below:

$$1.80 < NdH \tag{1}$$

where

NdH: average refractive index of the first lens, the second lens, and the third lens with respect to the d-line.

Preferably, the eyepiece optical system of the present invention satisfies a conditional expression (1') given below:

$$1.85 < NdH \tag{1'}$$

The eyepiece optical system of the present invention preferably satisfies a conditional expression (2) given below, and more preferably satisfies a conditional expression (2') given below:

$$0.60 < f3/f < 0.90 \tag{2}$$

$$0.65 < f3/f < 0.80 \tag{2'}$$

where f3: focal length of the third lens, and
f: focal length of the entire system.

In the eyepiece optical system of the present invention, the second lens preferably has a biconcave shape. Further, in the eyepiece optical system of the present invention, the third lens preferably has a biconvex shape.

The eyepiece optical system of the present invention preferably satisfies a conditional expression (3) given below, and more preferably satisfies a conditional expression (3') given below:

$$0.45 < |f2/f| < 0.75 \tag{3}$$

$$0.50 < |f2/f| < 0.60 \tag{3'}$$

where f2: focal length of the second lens, and
f: focal length of the entire system.

The eyepiece optical system of the present invention preferably satisfies conditional expressions (4) and (5) given below simultaneously, and more preferably satisfies at least either one of conditional expressions (4') and (5') given below, while satisfying the conditional expressions (4) and (5):

$$1.30 < |\phi 2f/\phi A| \tag{4}$$

$$0.95 < \phi 3r/\phi A \tag{5}$$

$$1.35 < |\phi 2f/\phi A| \tag{4'}$$

$$1.05 < \phi 3r/\phi A \tag{5'}$$

where $\phi 2f$: power of the object side surface of the second lens,
$\phi 3r$: power of the eye point side surface of the third lens, and
$\phi A$: power of the entire system.

The eyepiece optical system of the present invention preferably satisfies a conditional expression (6) given below, and more preferably satisfies a conditional expression (6') given below:

$$35.0° < 2\omega \tag{6}$$

$$37.0° < 2\omega \tag{6'}$$

where

2ω: maximum viewing angle in the total angle of view.

In the eyepiece optical system of the present invention, the third lens is formed to have a non-circular outer shape in a plane perpendicular to the optical axis and preferably satisfies a conditional expression (7) given below, and more preferably satisfies a conditional expression (7') given below:

$$r1/r2<0.80 \quad (7)$$

$$r1/r2<0.70 \quad (7')$$

where r1: shortest distance from the optical axis to the periphery of the third lens in a diameter direction, and r2: longest distance from the optical axis to the periphery of the third lens in a diameter direction.

The term "substantially" intends that a lens having substantially no refractive power, an optical element other than a lens, such as a stop, a cover glass, and the like, a lens flange, a lens barrel, and the like may be included, in addition to the constituent elements described above.

The surface shapes and the signs of refractive powers of the aforementioned lenses are considered in the paraxial region if they include aspherical surfaces.

In the present invention, a hybrid aspherical lens (lens composed of a spherical lens and an aspherically shaped film stacked on the spherical lens) is not regarded as a cemented lens and treated as one lens.

An imaging apparatus of the present invention is equipped with the eyepiece optical system of the present invention described above.

According to the eyepiece optical system of the present invention, the optical system is composed of three lenses and configured to satisfy given conditional expressions by suitably forming each lens. This allows a compact configuration to be realized, yet having a sufficiently wide viewing angle and high optical performance that can match with higher pixel count.

According to the imaging apparatus of the present invention, the apparatus is equipped with the eyepiece optical system of the present invention, so that the apparatus can be configured small with a sufficiently wide viewing angle, thereby allowing a high resolution and good image to be observed.

DESCRIPTION OF THE PREFERRED EMBODIMENTS

Hereinafter, embodiments of the present invention will be described in detail with reference to the accompanying drawings.

Figure 1:
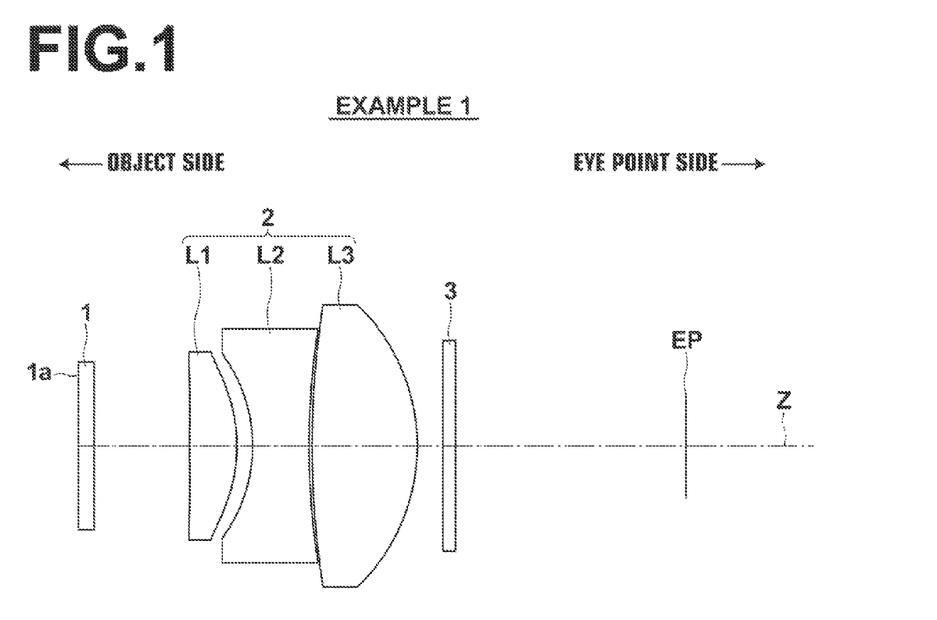
FIG. 1 is a cross-sectional view of an eyepiece optical system of Example 1 of the present invention, illustrating the configuration thereof.
Figure 2:
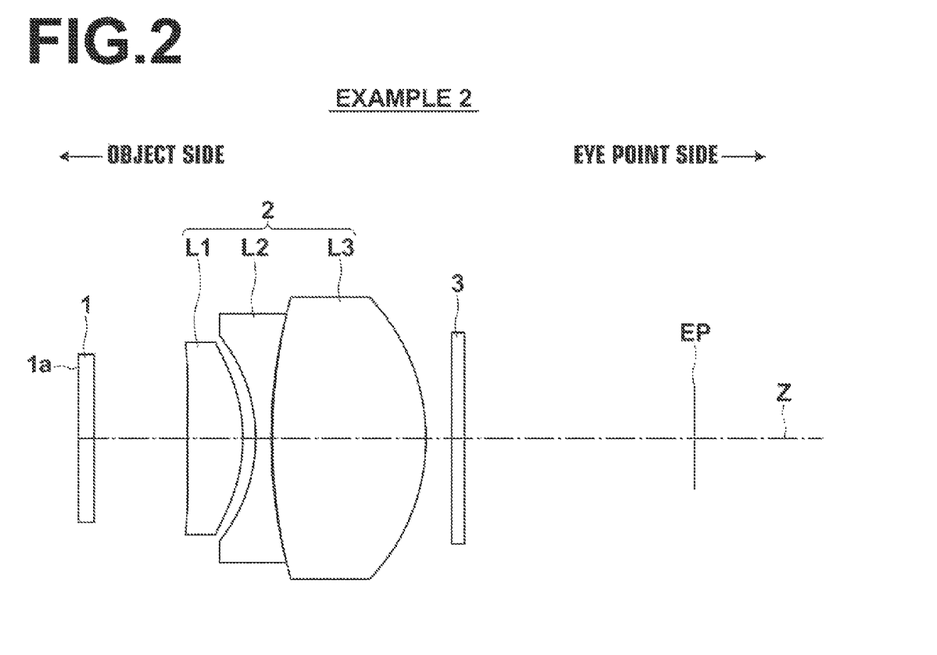
FIG. 2 is a cross-sectional view of an eyepiece optical system of Example 2 of the present invention, illustrating the configuration thereof.
Figure 3:
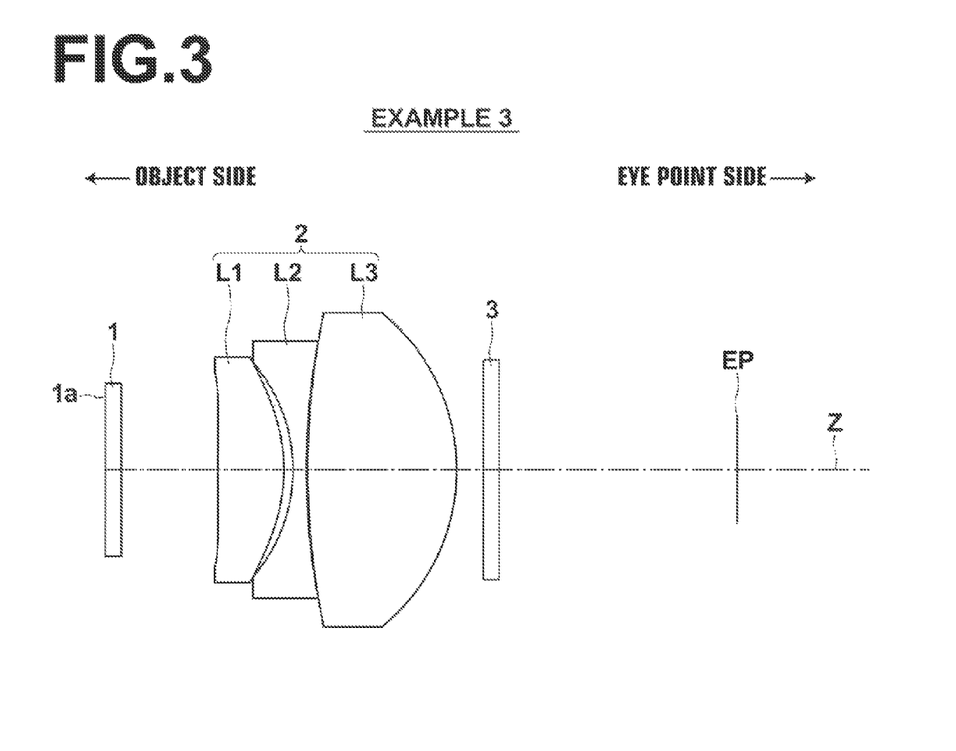
FIG. 3 is a cross-sectional view of an eyepiece optical system of Example 3 of the present invention, illustrating the configuration thereof.

FIG. 1 is a cross-sectional view of an eyepiece optical system according to one embodiment of the present invention, illustrating the configuration thereof. The example illustrated in FIG. 1 corresponds to an eyepiece optical system of Example 1, to be described later. Likewise, configuration examples corresponding to Example 2 and Example 3, to be described later, are illustrated in FIGS. 2 and 3 respectively. As the basic configuration of the configuration examples shown in FIGS. 1 to 3 is identical, a description will be made, hereinafter, with reference mainly to FIG. 1.

The eyepiece optical system 2 is used to magnify an image displayed on a display screen 1*a* of a display element 1 for observation. As for the display element 1, for example, a liquid crystal display element may be used. In FIG. 1, the eyepiece optical system 2 is depicted with the object side on the left and the eye point side (observer side) on the right. Note that the eye point EP shown in FIG. 1 does not represent the size or shape but indicates the position in an optical axis direction. FIG. 1 shows an example in which a parallel plate optical member 3 assuming, for example, a protection member or a filter is disposed between the eyepiece optical system and the eye point EP, but the optical member 3 is not a constituent element essential to the present invention.

The eyepiece optical system 2 substantially consists of three lenses, composed of a first lens L1 having a positive refractive power with a convex surface on the eye point side, a second lens L2 having a negative refractive power with a concave surface on the object side, and a third lens L3 having a positive refractive power with an absolute value of radius of curvature of the eye point side surface being smaller than an absolute value of radius of curvature of the object side surface, disposed in order from the object side along the optical axis Z. The first lens L1, the second lens L2, and the third lens L3 are all formed as single lenses. Such a triplet-type configuration composed of three lenses of positive, negative, and positive power arrangement allows a compact configuration for the optical system, yet having performance that can match with higher pixel count.

Formation of the eye point side surface of the first lens L1 in a convex surface and the object side surface of the second lens L2 in a concave surface may contribute to downsizing. The second lens L2 is preferably formed in a biconcave shape and doing so is advantageous for chromatic aberration correction. Further, if the second lens L2 is formed in a biconcave shape, the second lens L2 may have a strong power and, as a result, the third lens L3 may also have a strong power, which is advantageous for the downsizing of overall length of the optical system.

Formation of the third lens L3 such that the eye point side surface has a stronger power than that of the object side surface may give a strong refraction effect to the rays heading towards the eye point side from the third lens L3, which is advantageous for the downsizing of the lens system. Further, the third lens L3 is preferably formed in a biconvex shape, and doing so allows the third lens L3 to have a strong power, which is further advantageous for the reduction in overall length of the lens system.

At least one lens of the eyepiece optical system 2 may be an aspherical lens. For example, the first lens L1 may be an aspherical lens, and doing so is advantageous for securing a wide viewing angle and high optical performance that can match with higher pixel count.

The eyepiece optical system 2 is configured to satisfy a conditional expression (1) given below:

$$1.80 < NdH \tag{1}$$

where

NdH: average refractive index of the first lens, the second lens, and the third lens with respect to the d-line The conditional expression (1) relates to a preferable range of average refractive index of three lenses of the eyepiece optical system 2 with respect to the d-line. Increase in viewing angle causes field curvature to be aggravated and the absolute value of Petzval sum tends to increase. Selection of a material of each lens such that the optical system does not fall to or below the lower limit of the conditional expression (1) allows the absolute value of Petzval sum to be kept small. Further, amounts of aberrations generated may be suppressed, whereby both a wide viewing angle and high optical performance may be realized.

In order to further enhance the effects of the conditional expression (1) described above, the optical system more preferably satisfies a conditional expression (1') given below.

$$1.85 < NdH \tag{1'}$$

The eyepiece optical system 2 preferably satisfies a conditional expression (2) given below:

$$0.60 < f3/f < 0.90 \tag{2}$$

where f3: focal length of the third lens
f: focal length of the entire system

The conditional expression (2) relates to a favorable range of the ratio between the focal length of the third lens L3 and the focal length of the entire system. Configuration of the optical system so as not to fall to or below the lower limit of the conditional expression (2) allows aberrations, including field curvature, to be corrected satisfactorily and high performance to be maintained easily. Configuration of the optical system so as not to reach or exceed the upper limit of the conditional expression (2) allows downsizing of the optical system to be achieved easily.

In order to further enhance the effects of the conditional expression (2) described above, the optical system more preferably satisfies a conditional expression (2') given below.

$$0.65 < f3/f < 0.80 \tag{2'}$$

Further, the eyepiece optical system 2 preferably satisfies a conditional expression (3) given below:

$$0.45 < |f2/f| < 0.75 \tag{3}$$

where f2: focal length of the second lens
f: focal length of the entire system

The conditional expression (3) relates to a favorable range of the ratio between the focal length of the second lens L2 and the focal length of the entire system. Configuration of the optical system so as not to fall to or below the lower limit of the conditional expression (3) allows aberrations, including field curvature, to be corrected satisfactorily and high performance to be maintained easily. Selection of a material of the first lens L1, the second lens L2, and the third lens L3 from currently available optical materials so as to satisfy the conditional expression (1) may result in that the distribution range of Abbe numbers of each lens with respect to the d-line is reduced in comparison with the case in which the conditional expression (1) is not satisfied, but configuration of the optical system so as not to reach or exceed the upper limit of the conditional expression (3) allows a satisfactory correction of chromatic aberration to be achieved easily, even though a material limited by the conditional expression (1) is used.

In order to further enhance the effects of the conditional expression (3) described above, the optical system more preferably satisfies a conditional expression (3') given below.

$$0.50 < |f2/f| < 0.60 \tag{3'}$$

Still further, the eyepiece optical system 2 preferably satisfies conditional expressions (4) and (5) given blow simultaneously.

$$1.30 < |\phi 2f/\phi A| \tag{4}$$

$$0.95 < \phi 3r/\phi A \tag{5}$$

where $\phi 2f$: power of the object side surface of the second lens
$\phi 3r$: power of the eye point side surface of the third lens
$\phi A$: power of the entire system The conditional expression (4) relates to a favorable range of the ratio between the power of the object side surface of the second lens L2 and the power of the entire system. Note that the power $\phi 2f$ of the object side surface of the second lens L2 is expressed, when the radius of curvature of the object side surface of the second lens L2 is taken as R2f and the refractive index of the second lens L2 with respect to the d-line is taken as Nd2, as $\phi 2f=(Nd2-1)/R2f$. The power of the entire system is inverse of the focal length of the entire system.

The conditional expression (5) relates to a favorable range of the ratio between the power of the eye point side surface of the third lens L3 and the power of the entire system. Note that the power $\phi 3r$ of the eye point side surface of the third lens L3 is expressed, when the radius of curvature of the eye point side surface of the third lens L3 is taken as R3r and the refractive index of the third lens L3 with respect to the d-line is taken as Nd3, as $\phi 3r=(1-Nd3)/R3r$.

Selection of a material of the first lens L1, the second lens L2, and the third lens L3 from currently available optical materials so as to satisfy the conditional expression (1) may result in that the distribution range of Abbe numbers of each lens with respect to the d-line is reduced in comparison with the case in which the conditional expression (1) is not satisfied, as described above, but configuration of the optical system so as to satisfy the conditional expressions (4) and (5) simultaneously allows a satisfactory correction of chromatic aberration to be achieved easily, even though a material limited by the conditional expression (1) is used.

In order to further enhance the effects of the conditional expressions (4) and (5) described above, the optical system more preferably satisfies at least either one of conditional expressions (4') and (5') given below and further preferably satisfies at least either one of conditional expressions (4") and (5") given below, while satisfying the conditional expressions (4) and (5).

$$1.35<|\phi 2f/\phi A| \tag{4'}$$

$$1.05<\phi 3r/\phi A \tag{5'}$$

$$1.35<|\phi 2f/\phi A|<1.55 \tag{4''}$$

$$1.10<\phi 3r/\phi A<1.30 \tag{5''}$$

Setting of the power of the second lens L2 such that the optical system does not reach or exceed the upper limit of the conditional expression (4") is advantageous for securing high optical performance that can match with higher pixel count. Setting of the power of the third lens L3 such that the optical system does not reach or exceed the upper limit of the conditional expression (5") is advantageous for securing high optical performance that can match with higher pixel count.

Further, the eyepiece optical system 2 preferably satisfies a conditional expression (6) given below:

$$35.0°<2\omega \tag{6}$$

where

2ω: maximum viewing angle in the total angle of view.

The conditional expression (6) relates to a favorable range of the viewing angle in the total angle of view. Configuration of the optical system so as not to fall to or below the lower limit of the conditional expression (6) allows a wide and comfortable viewing angle to be obtained.

In order to further enhance the effects of the conditional expression (6) described above, the optical system more preferably satisfies a conditional expression (6') given below.

$$37.0°<2\omega \tag{6'}$$

Still further, the third lens L3 may be formed to have a non-circular outer shape in a plane perpendicular to the optical axis and to satisfy a conditional expression (7) given below for downsizing.

$$r1/r2<0.80 \tag{7}$$

where r1: shortest distance from the optical axis to the periphery of the third lens in a diameter direction r2: longest distance from the optical axis to the periphery of the third lens in a diameter direction The conditional expression (7) relates to a shape of the third lens L3. Formation of the third lens L3 not to reach or exceed the upper limit of the conditional expression (7) allows optical parts to be downsized which eventually may contribute to downsizing of device size. For example, in a case in which the display screen 1a of the display element has a rectangular display area and the eyepiece optical system 2 is for observing an image displayed on the display area, if the directions of r1 and r2 are set to directions parallel to the short side and long side of the display area respectively, and the third lens L3 is formed to satisfy the conditional expression (7), device sizes may be reduced while matching with liquid crystal display elements of recent years.

Figure 4:
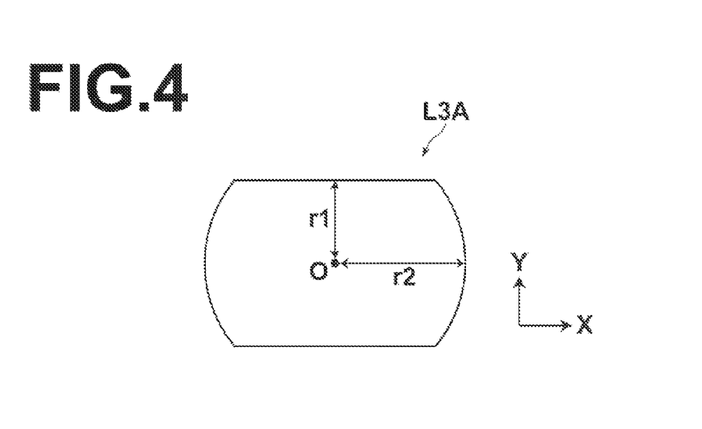
FIG. 4 is a drawing illustrating an example lens having a non-circular periphery.

FIG. 4 illustrates an example outer shape in a plane perpendicular to the optical axis of a third lens L3A having a non-circular outer shape. The third lens L3A shown in FIG. 4 has an outer shape formed by eliminating two opposite arched areas from a circle. FIG. 4 shows the intersection of the third lens L3A and the optical axis Z by the symbol "O", in addition to r1 and r2 of the third lens L3A with directions parallel to the long side and the short side of the rectangular display area of the display element 1 being indicated by the arrows X and Y respectively. In the example shown in FIG. 4, the directions of r1 and r2 correspond to the directions Y and X respectively.

Note that the non-circular outer shape is not limited to the example shown in FIG. 4 and the outer shape may be, for example, a shape formed by eliminating one arched area, as well as other shapes.

In order to further enhance the effects of the conditional expression (7) described above, the optical system more preferably satisfies a conditional expression (7') given below.

$$r1/r2<0.70 \tag{7'}$$

As described above, according to the eyepiece optical system 2 of the present embodiment, a compact configuration, yet having a sufficiently wide viewing angle and high optical performance that can match with higher pixel count may be achieved. Note that the aforementioned preferable configurations that the eyepiece optical system 2 of the present embodiment can possibly take may be combined in any manner and preferably used selectively, as appropriate, according to the required specifications.

Next, numerical examples of the eyepiece optical system of the present invention will be described.

Example 1

The lens configuration diagram of the eyepiece optical system of Example 1 is shown in FIG. 1. Tables 1 and 2 show basic lens data and aspherical surface coefficients of the eyepiece optical system of Example 1 respectively. The Si column in Table 1 indicates $i^{th}$ surface number in which a number i (i=1, 2, 3, - - - ) is given to each surface in a serially increasing manner toward the eye point side with the object side surface of the most object side constituent element being taken as the first surface, the Ri column indicates the radius of curvature of $i^{th}$ surface, the Di column indicates the surface distance on the optical axis Z between $i^{th}$ surface and $(i+1)^{th}$ surface, the Ndj column indicates the refractive index of $j^{th}$ optical element from the object side with respect to the d-line (wavelength of 587.56 nm) and the vdj column indicates the value of the Abbe number of $j^{th}$ optical element from the object side with respect to the d-line.

The basic lens data also include the display element 1, and the first surface and the second surface correspond to the display element 1. The sign of the radius of curvature is positive if the surface shape is convex on the object side and negative if it is convex on the eye point side.

A surface whose surface number has a mark "*" attached thereto is an aspherical surface, and a numerical value of paraxial radius of curvature is indicated in the radius of curvature column. Table 2 shows aspherical surface coefficients of these aspherical surfaces. In numerical values of aspherical surface coefficients in Table 2, the symbol "E-n" (n: integer) refers to "×10$^{-n}$". The aspherical surface coefficients are values of each of coefficients KA and Am (m=3, 4, 5, - - - and 20) in an aspherical surface formula represented by Formula (A) given below.

$$Zd = \frac{C \times h^2}{1 + \sqrt{1 - KA \times C^2 \times h^2}} + \sum_{\omega} Am + h^m \tag{A}$$

where:

Zd: depth of aspheric surface (length of vertical line from a point on the aspheric surface at a height h to a flat surface orthogonal to the optical axis to which the aspherical surface vertex contacts)

h: height (distance from the optical axis to lens surface)

C: paraxial curvature

KA, Am: aspherical surface coefficients (m=3, 4, 5, - - - and 20).

Tables shown herein indicate values rounded to a predetermined digit. As for the unit of each numerical value, "mm" is used for length and "°" is used for angle. But, these are only examples and other appropriate units may also be used, as optical systems can be used by proportionally enlarged or reduced.

TABLE 1

Example 1 Basic Lens Data

| Si | Ri | Di | Ndj | ν dj |
|---|---|---|---|---|
| 1 | ∞ | 1.200 | 1.51680 | 64.20 |
| 2 | ∞ | 7.482 | | |
| *3 | 172.2981 | 3.700 | 1.80139 | 45.45 |
| *4 | −12.2843 | 1.231 | | |
| 5 | −12.0396 | 4.397 | 1.94595 | 17.98 |
| 6 | 58.9454 | 0.245 | | |
| 7 | 71.7649 | 8.212 | 1.95375 | 32.32 |
| 8 | −15.3549 | | | |

TABLE 2

Example 1 Aspherical Surface Coefficient

| Si | 3 | 4 |
|---|---|---|
| KA | 1.00000E+00 | 1.00000E+00 |
| A3 | 0 | 1.74466E−04 |
| A4 | −1.31370E−04 | 2.32480E−04 |
| A5 | 0 | −1.24180E−04 |
| A6 | −1.04603E−06 | 1.85710E−05 |
| A7 | 0 | 3.91446E−07 |
| A8 | 5.78042E−08 | −3.38139E−08 |
| A9 | 0 | −4.2802E−08 |
| A10 | −8.70881E−10 | 3.55951E−09 |
| A11 | 0 | −2.45571E−11 |
| A12 | −2.96777E−14 | −4.23385E−12 |
| A13 | 0 | 8.49443E−13 |
| A14 | 7.12182E−13 | 5.35953E−13 |
| A15 | 0 | −1.89001E−15 |
| A16 | −1.61108E−14 | 2.47612E−15 |
| A17 | 0 | −1.06321E−15 |
| A18 | 2.26405E−16 | 0 |
| A19 | 0 | 0 |
| A20 | −1.91892E−18 | 0 |

Figure 5:
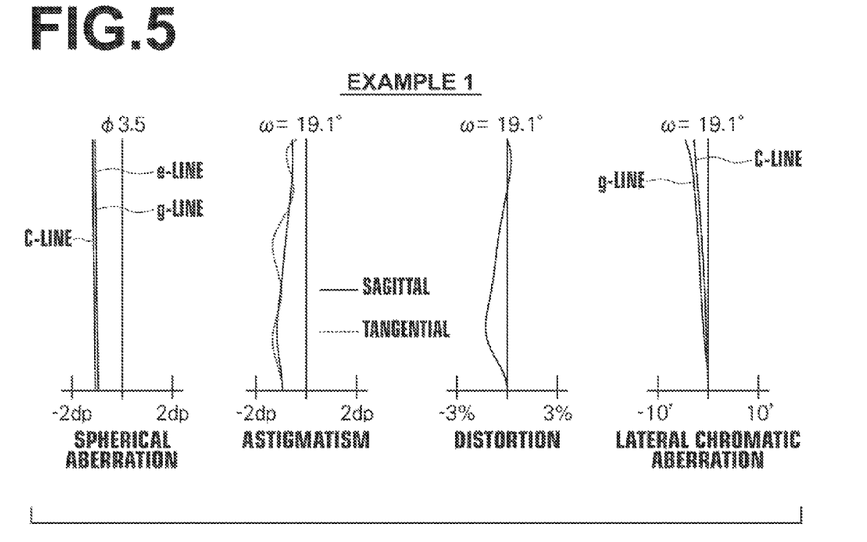
FIG. 5 shows aberration diagrams of the eyepiece optical system of Example 1 of the present invention, in which diagrams of spherical aberration, astigmatism, distortion, and lateral chromatic aberration are arranged from the left in the drawing.

FIG. 5 shows aberration diagrams of the eyepiece optical system of Example 1, in which diagrams of spherical aberration, astigmatism, distortion, and lateral chromatic aberration are arranged from the left in the drawing. Each aberration diagram of spherical aberration, astigmatism, and distortion illustrates aberration with the e-line (wavelength 546.07 nm) as the reference wavelength, but the spherical aberration diagram also illustrates aberrations with respect to the C-line (wavelength 656.27 nm) and the g-line (435.84 nm), while the lateral chromatic aberration diagram illustrates aberrations with respect to the C-line and the g-line. The unit of the horizontal axes of the spherical aberration diagram and the astigmatism diagram is diopter, the unit of the horizontal axis of the distortion diagram is %, and the unit of the horizontal axis of the lateral chromatic aberration diagram is minute. The vertical axis of the spherical aberration diagram represents pupil diameter and the upper end of the vertical axis corresponds to the maximum pupil diameter. The vertical axes of the diagrams of astigmatism, distortion, and lateral chromatic aberration represent viewing angle and the upper end of the vertical axis corresponds to the maximum viewing angle in half angle of view. In the astigmatism diagram, the solid line illustrates aberration in the sagittal direction and the broken line illustrates aberration in the tangential direction.

The symbols, their meanings, and the representation method of various types of data with respect to Example 1 are applicable to those of the following Examples, unless otherwise specifically described, and duplicated description will be omitted hereinafter.

Example 2

Figure 6:
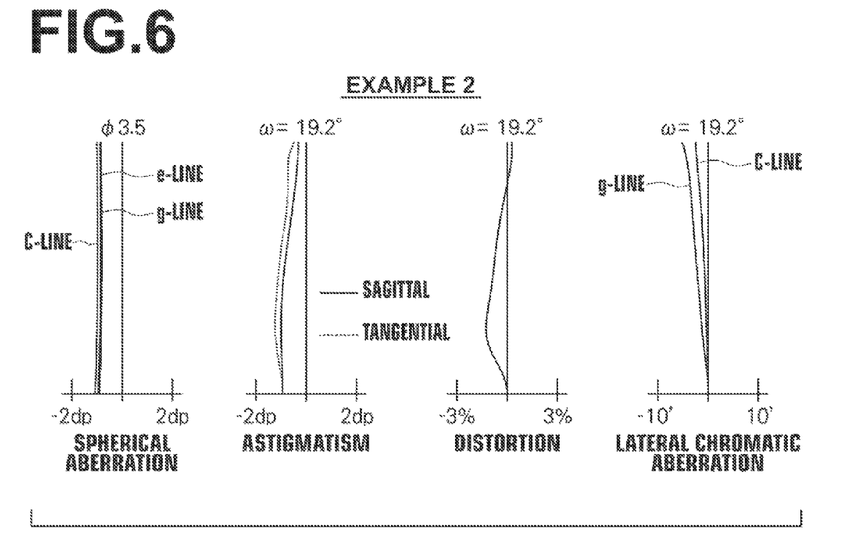
FIG. 6 shows aberration diagrams of the eyepiece optical system of Example 2 of the present invention, in which diagrams of spherical aberration, astigmatism, distortion, and lateral chromatic aberration are arranged from the left in the drawing.

The lens configuration diagram of the eyepiece optical system of Example 2 is shown in FIG. 2. Tables 3 and 4 show basic lens data and aspherical surface coefficients of the eyepiece optical system of Example 2 respectively. FIG. 6 shows aberration diagrams of the eyepiece optical system of Example 2, in which diagrams of spherical aberration, astigmatism, distortion, and lateral chromatic aberration are arranged from the left in the drawing.

TABLE 3

Example 2 Basic Lens Data

| Si | Ri | Di | Ndj | ν dj |
|---|---|---|---|---|
| 1 | ∞ | 1.200 | 1.51680 | 64.20 |
| 2 | ∞ | 7.300 | | |
| *3 | 101.3332 | 4.350 | 1.80348 | 40.45 |
| *4 | −12.9227 | 1.000 | | |
| 5 | −12.7401 | 1.200 | 1.95906 | 17.47 |
| 6 | 39.3630 | 0.100 | | |
| 7 | 42.7650 | 12.00 | 1.95375 | 32.32 |
| 8 | −15.9262 | | | |

TABLE 4

Example 2 Aspherical Surface Coefficient

| Si | 3 | 4 |
|---|---|---|
| KA | 1.00000E+00 | 1.00000E+00 |
| A3 | −2.73581E−03 | −1.82043E−03 |
| A4 | 1.26698E−03 | 1.15295E−03 |
| A5 | −2.22912E−04 | −2.45870E−04 |
| A6 | −5.47948E−07 | 1.74095E−05 |
| A7 | 1.83598E−06 | 5.90827E−07 |
| A8 | 9.54297E−08 | 3.01143E−08 |
| A9 | −1.56329E−08 | −3.75556E−08 |
| A10 | 1.41396E−09 | 4.13819E−09 |
| A11 | −3.66838E−10 | −1.26579E−12 |
| A12 | −2.37782E−11 | −2.52905E−11 |
| A13 | 4.75026E−12 | −9.83847E−13 |
| A14 | 8.97342E−13 | 4.38775E−13 |
| A15 | −2.90681E−14 | −1.61625E−14 |
| A16 | −2.11996E−14 | 2.84942E−15 |
| A17 | 7.74924E−16 | −6.56982E−16 |
| A18 | 1.92567E−16 | 2.40859E−17 |
| A19 | 3.60599E−18 | 6.52149E−18 |
| A20 | −2.02796E−18 | −7.17226E−19 |

Example 3

Figure 7:
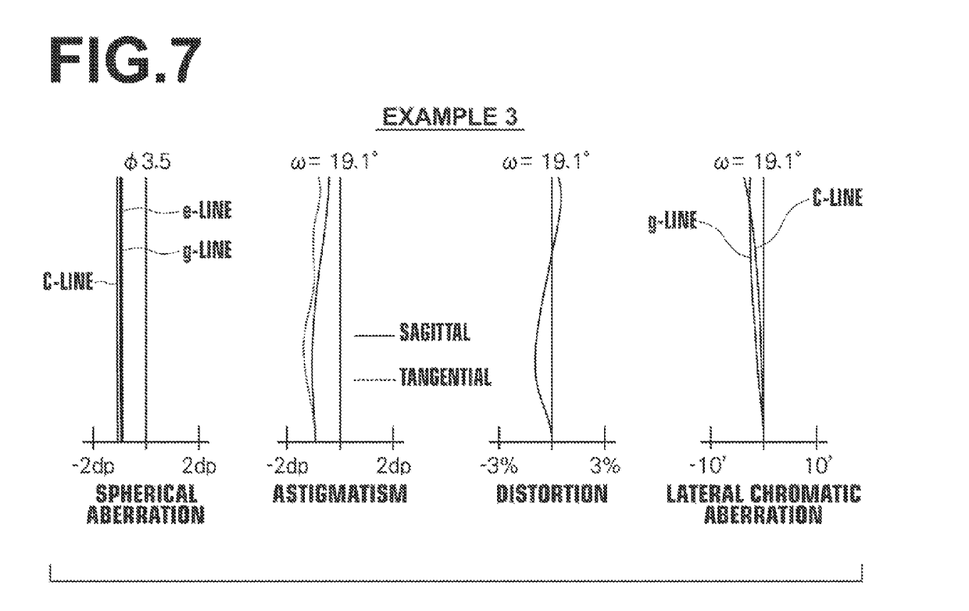
FIG. 7 shows aberration diagrams of the eyepiece optical system of Example 3 of the present invention, in which diagrams of spherical aberration, astigmatism, distortion, and lateral chromatic aberration are arranged from the left in the drawing.

The lens configuration diagram of the eyepiece optical system of Example 3 is shown in FIG. 3. Tables 5 and 6 show basic lens data and aspherical surface coefficients of the eyepiece optical system of Example 3 respectively. FIG. 7 shows aberration diagrams of the eyepiece optical system of Example 3, in which diagrams of spherical aberration, astigmatism, distortion, and lateral chromatic aberration are arranged from the left in the drawing.

TABLE 5

Example 3 Basic Lens Data

| Si | Ri | Di | Ndj | νdj |
|---|---|---|---|---|
| 1 | ∞ | 1.200 | 1.51680 | 64.20 |
| 2 | ∞ | 7.300 | | |
| *3 | 156.1590 | 5.000 | 1.80220 | 40.68 |
| *4 | −12.9476 | 0.689 | | |
| 5 | −12.3293 | 1.000 | 1.95906 | 17.47 |
| 6 | 52.3050 | 0.107 | | |
| 7 | 59.2034 | 11.250 | 1.95375 | 32.32 |
| 8 | −15.2769 | | | |

TABLE 6

Example 3 Aspherical Surface Coefficient

| Si | 3 | 4 |
|---|---|---|
| KA | 1.00000E+00 | 1.00000E+00 |
| A3 | −5.55255E−04 | −1.52493E−04 |
| A4 | 1.07449E−04 | 1.70504E−04 |
| A5 | −6.39124E−05 | −5.18737E−05 |
| A6 | 1.80882E−05 | 1.80618E−05 |
| A7 | −1.49474E−06 | −1.89724E−06 |
| A8 | −1.55902E−07 | −6.93500E−08 |
| A9 | −6.38619E−09 | −2.26611E−08 |
| A10 | 4.60347E−09 | 6.54891E−09 |
| A11 | −8.04934E−11 | 1.84786E−10 |
| A12 | −6.55930E−11 | 2.13778E−12 |
| A13 | 9.61241E−12 | −5.62120E−12 |
| A14 | 1.50800E−12 | −2.54201E−13 |
| A15 | −2.60051E−14 | −5.53120E−14 |
| A16 | −3.59188E−14 | 2.84233E−15 |
| A17 | −1.14901E−15 | −1.39159E−16 |
| A18 | 4.41978E−17 | 8.40205E−17 |
| A19 | 2.71743E−18 | 2.00612E−17 |
| A20 | 3.32408E−18 | −2.16828E−18 |

Table 7 summarizes the values corresponding to the aforementioned conditional expressions (1) to (6) for each of Examples 1 to 3 described above and the values related to the conditional expressions. Note that the data in Table 7 are those with respect to the d-line.

TABLE 7

Values of Conditional Exmpressions

| | | Example 1 | Example 2 | Example 3 |
|---|---|---|---|---|
| Expression (1) | NdH | 1.90 | 1.91 | 1.91 |
| Expression (2) | f3/f | 0.74 | 0.73 | 0.73 |
| Expression (3) | \|f2/f\| | 0.55 | 0.53 | 0.55 |
| Expression (4) | \|φ2f/φA\| | 1.47 | 1.40 | 1.46 |
| Expression (5) | φ3r/φA | 1.16 | 1.11 | 1.17 |
| Expression (6) | 2ω | 38.3 | 38.5 | 38.3 |
| | f | 18.674 | 18.607 | 18.753 |
| | f2 | −10.260 | −9.924 | −10.325 |
| | f3 | 13.902 | 13.516 | 13.746 |

As is known from the data shown above, the eyepiece optical systems of Examples 1 to 3 are configured small, each with a small number of lenses of three, yet having a wide maximum viewing angle of about 38° in the total angle of view and high optical performance.

Figure 8A:
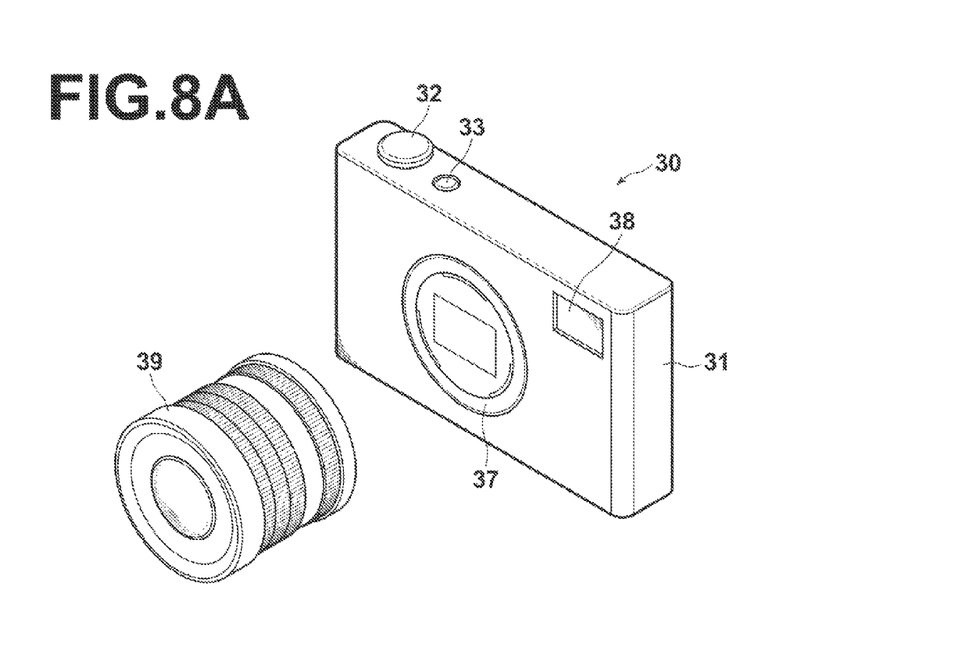
FIG. 8A is a front side perspective view of an imaging apparatus according to one embodiment of the present invention.
Figure 8B:
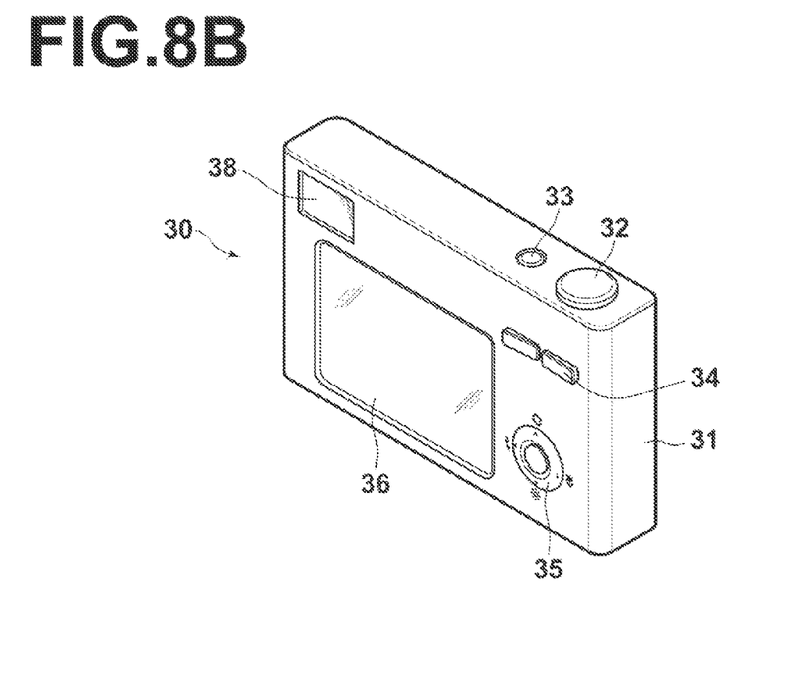
FIG. 8B is a rear side perspective view of the imaging apparatus according to the one embodiment of the present invention.

Next, embodiments of an imaging apparatus according to the present invention will be described. FIGS. 8A and 8B are front side and rear side perspective views of a camera 30 respectively, which is an imaging apparatus according to one embodiment of the present invention, illustrating a schematic configuration thereof. The camera 30 includes a camera body 31. The camera body 31 includes a finder 38 on the upper side, a shutter button 32 and a power button 33 on the upper face, and operation sections 34, 35 and a display section 36 on the rear face. The camera body 31 includes a mount 37 that can accept an imaging lens 39 in the center of the front face. The imaging lens 39 may be an interchangeable lens. The finder 38 includes inside thereof a display element, for example, a liquid crystal display element and an eyepiece optical system according to an embodiment of the present invention, thereby allowing an observer to observe an image which is displayed on the display screen of the display element and magnified by the eyepiece optical system.

Figure 9:
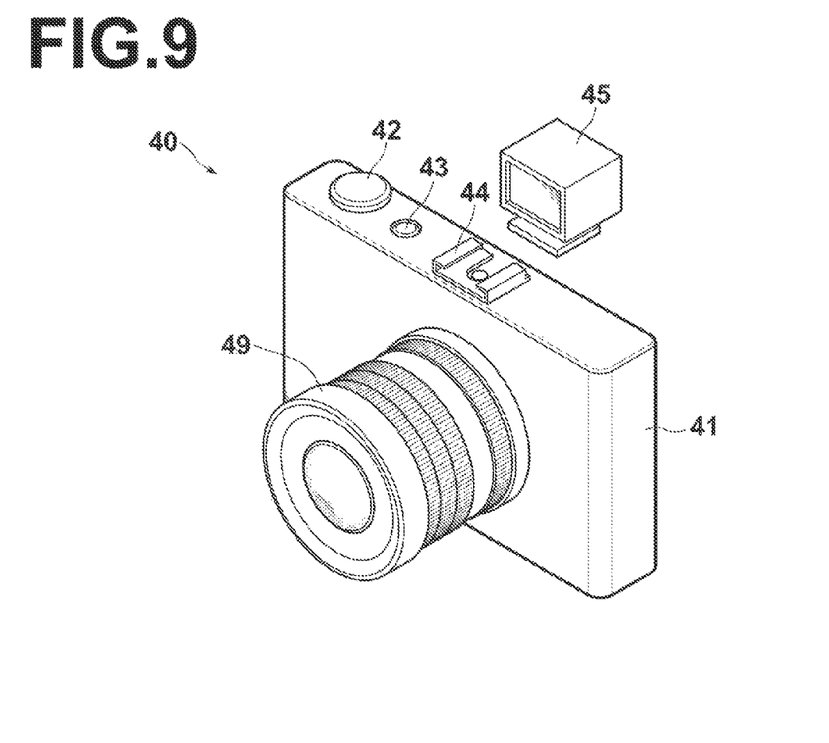
FIG. 9 is a perspective view of an imaging apparatus according to another embodiment of the present invention.

FIG. 9 is a perspective view of a camera 40, which is an imaging apparatus according to another embodiment of the present invention, illustrating a schematic configuration thereof. The camera 40 differs largely from the camera 30 in that it includes an external finder 45 instead of a built-in finder. The camera 40 includes a camera body 41. The camera body 41 includes a shutter button 42, a power button 43, and a hot shoe 44 on the upper face, and an imaging lens 49 is mounted in the center of the front face. The external finder 45 includes an eyepiece optical system according to an embodiment of the present invention and is removably attached to the hot shoe 44.

So far, the present invention has been described by way of embodiments and Examples, but it should be understood that the present invention is not limited to the embodiments and the Examples described above, and various changes and modifications may be made. For example, values of radius of curvature, surface distance, refractive index, Abbe number, and aspherical surface coefficient of each lens are not limited to those shown in each numerical example and may take other values.

What is claimed is:

1. An eyepiece optical system, substantially consisting of three lenses, composed of a first lens having a positive refractive power with a convex surface on the eye point side, a second lens having a negative refractive power with a concave surface on the object side, and a third lens having a positive refractive power with an absolute value of radius of curvature of the eye point side surface being smaller than an absolute value of radius of curvature of the object side surface, disposed in order from the object side, wherein:

the first, the second, and the third lenses are all single lenses; and the eyepiece optical system satisfies a conditional expression (1) given below:

$$1.80 < NdH \quad (1)$$

where

NdH: average refractive index of the first lens, the second lens, and the third lens with respect to the d-line.

2. The eyepiece optical system as claimed in claim 1, wherein the eyepiece optical system satisfies a conditional expression (2) given below:

$$0.60 < f3/f < 0.90 \quad (2)$$

where f3: focal length of the third lens, and f: focal length of the entire system.

3. The eyepiece optical system as claimed in claim 1, wherein second lens has a biconcave shape.

4. The eyepiece optical system as claimed in claim 1, wherein the eyepiece optical system satisfies a conditional expression (3) given below:

$$0.45 < |f2/f| < 0.75 \quad (3)$$

where
- f2: focal length of the second lens, and
- f: focal length of the entire system.

5. The eyepiece optical system as claimed in claim 1, wherein the eyepiece optical system satisfies conditional expressions (4) and (5) given below simultaneously:

$$1.30 < |\phi 2f/\phi A| \tag{4}$$

$$0.95 < \phi 3r/\phi A \tag{5}$$

where
- φ2f: power of the object side surface of the second lens
- φ3r: power of the eye point side surface of the third lens, and
- φA: power of the entire system.

6. The eyepiece optical system as claimed in claim 1, wherein the eyepiece optical system satisfies a conditional expression (6) given below:

$$35.0° < 2\omega \tag{6}$$

where
- 2ω: maximum viewing angle in the total angle of view.

7. The eyepiece optical system as claimed in claim 1, wherein:
- the third lens has a non-circular outer shape in a plane perpendicular to the optical axis; and
- the eyepiece optical system satisfies a conditional expression (7) given below:

$$r1/r2 < 0.80 \tag{7}$$

where
- r1: shortest distance from the optical axis to the periphery of the third lens in a diameter direction, and
- r2: longest distance from the optical axis to the periphery of the third lens in a diameter direction.

8. The eyepiece optical system as claimed in claim 1, wherein the third lens has a biconvex shape.

9. The eyepiece optical system as claimed in claim 1, wherein the eyepiece optical system satisfies a conditional expression (1') given below:

$$1.85 < NdH \tag{1'}$$

10. The eyepiece optical system as claimed in claim 2, wherein the eyepiece optical system satisfies a conditional expression (2') given below:

$$0.65 < f3/f < 0.80 \tag{2'}$$

11. The eyepiece optical system as claimed in claim 4, wherein the eyepiece optical system satisfies a conditional expression (3') given below:

$$0.50 < |f2/f| < 0.60 \tag{3'}$$

12. The eyepiece optical system as claimed in claim 5, wherein the eyepiece optical system satisfies a conditional expression (4') given below:

$$1.35 < |\phi 2f/\phi A| \tag{4'}$$

13. The eyepiece optical system as claimed in claim 5, wherein the eyepiece optical system satisfies a conditional expression (5') given below:

$$1.05 < \phi 3r/\phi A \tag{5'}$$

14. The eyepiece optical system as claimed in claim 6, wherein the eyepiece optical system satisfies a conditional expression given below:

$$37.0° < 2\omega \tag{6'}$$

15. The eyepiece optical system as claimed in claim 7, wherein the eyepiece optical system satisfies a conditional expression (7') given below:

$$r1/r2 < 0.70 \tag{7'}$$

16. An imaging lens equipped with the eyepiece optical system as claimed in claim 1.

* * * * *